(12) United States Patent
Plantz

(10) Patent No.: US 6,621,050 B2
(45) Date of Patent: Sep. 16, 2003

(54) PORTABLE WELDER

(76) Inventor: Basil L. Plantz, PMB 484 EXPWY 100 Shepherd of the Hills Expressway, Branson, MO (US) 65616

(*) Notice: Subject to any disclaimer, the term of this patent is extended or adjusted under 35 U.S.C. 154(b) by 6 days.

(21) Appl. No.: 10/055,632

(22) Filed: Oct. 26, 2001

(65) Prior Publication Data

US 2002/0166851 A1 Nov. 14, 2002

Related U.S. Application Data

(60) Provisional application No. 60/243,812, filed on Oct. 27, 2000.

(51) Int. Cl.$^7$ ................................................ B23K 9/10
(52) U.S. Cl. .......................................... 219/133; 322/7
(58) Field of Search ................................ 219/133, 134; 322/7

(56) References Cited

U.S. PATENT DOCUMENTS

| | | | |
|---|---|---|---|
| 3,480,757 A | | 11/1969 | Ogden |
| 3,593,121 A | | 7/1971 | Jones |
| 3,649,903 A | | 3/1972 | Fiedler |
| 3,676,694 A | | 7/1972 | Schneider |
| 3,770,976 A | | 11/1973 | Stroud |
| 3,829,652 A | | 8/1974 | Terry |
| 4,314,195 A | | 2/1982 | Muter |
| 4,330,715 A | | 5/1982 | Stroud et al. |
| 4,694,140 A | | 9/1987 | Wheeler |
| 4,749,935 A | | 6/1988 | Osborne |
| 4,868,480 A | * | 9/1989 | van der Linde ................ 322/7 |
| 4,999,563 A | | 3/1991 | Suzuki |
| 5,343,016 A | | 8/1994 | Davis |
| 5,444,214 A | | 8/1995 | Crouse |
| 5,606,244 A | * | 2/1997 | Migdal ........................... 322/7 |
| 5,708,254 A | | 1/1998 | Ikegami |
| 5,936,320 A | | 8/1999 | Takeda |
| 6,040,556 A | | 3/2000 | Shinya |
| 6,051,809 A | | 4/2000 | Colella |

FOREIGN PATENT DOCUMENTS

| | | | |
|---|---|---|---|
| DE | 2807342 | * | 8/1978 |
| GB | 2219154 | * | 11/1989 |
| JP | 6-285650 | * | 10/1994 |

* cited by examiner

Primary Examiner—Clifford C. Shaw
(74) Attorney, Agent, or Firm—Porter, Wright, Morris & Arthur, LLP

(57) ABSTRACT

A portable welding apparatus for use with a motor vehicle includes an internal combustion engine and an electrical current generating alternator operably connected to the engine to be driven thereby. The alternator is a three-phase AC alternator having a first DC rectifier which converts AC current to a first DC current using resistors across phase to lag each phase at 120 degrees allowing phases to operate simultaneously and a second DC rectifier which converts AC current to a second DC current using resistors across phase to lag each phase at 120 degrees allowing phases to operate simultaneously. The alternator includes a three phase armature having three windings and the first and second DC rectifiers each include six diodes connected to the armature, the diodes are configured in three parallel legs with each leg having two of the diodes, and the three legs are connected to separate ones of the three windings between the diodes. The armature is preferably wound in a wye configuration. The first and second DC rectifiers each have two of the resistors, a first one of the resistors connects a first one of the legs with a second one of the legs between the diodes, and a second one of the resistors connects the second one of the legs with a third one of the legs between the diodes. Preferably, exposed taps are provided for the AC current and the separate first and second DC currents.

18 Claims, 3 Drawing Sheets

PORTABLE WELDER

CROSS-REFERENCE TO RELATED APPLICATIONS

This application claims the benefit of provisional patent application No. 60/243,812 filed on Oct. 27, 2000.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates an engine driven arc welder or welding apparatus and, more particularly, to such an apparatus which is portable and provides high power DC and AC outputs for selectively welding or operating power tools.

BACKGROUND OF THE INVENTION

Conventional electrical systems for engines of motor vehicles such as trucks and automobiles typically include a DC battery, a dynamo adapted to deliver low voltage DC power, and a voltage regulator controlling the output voltage of the dynamo in response to the charge variation of the battery. Typically, the dynamo is an alternating current generator or alternator. Conventional alternators include a rotor which is driven by the engine via a pulley/belt system and a stator having three windings which are usually arranged in a wye configuration or a delta configuration to provide three phase AC output. The alternators typically have a rectifying circuit adapted to transform the AC output to DC which is then used to power the motor vehicle electrical system and charge the battery. Conventional alternators have only the DC taps exposed and not the AC taps.

Additionally, portable welding apparatus are known which include engine driven alternators to provide the necessary DC power. While such alternators may generate sufficient amps to operate some direct current welders, they provide limited amps such that all welder can not be operated and thus all material cannot be welded. Additionally, such alternators do provide the necessary AC power to operate auxiliary power tools such as, for example, lights. Accordingly, there is a need in the art for improved portable engine driven welding apparatus which generates necessary DC power to weld an increased variety of materials and/or the necessary AC power to operate auxiliary power tools.

SUMMARY OF THE INVENTION

The present invention provides a portable engine-driven welding which overcomes at least some of the above-noted problems of the related art. According to the present invention, a portable welding apparatus for use with a motor vehicle comprises, in combination, an internal combustion engine of the motor vehicle and an electrical current generating alternator operably connected to the engine to be driven thereby. The alternator is a three-phase AC alternator having a DC rectifier which converts AC current to DC current using resistors across phase to lag each phase at 120 degrees allowing phases to operate simultaneously. Preferably, the alternator includes DC taps for welding and AC taps for powering auxiliary equipment. Additionally, the alternator preferably generates at least 300 amps AC and 300 amps DC.

According to another aspect of the present invention, a portable welding apparatus for use with a motor vehicle includes an internal combustion engine of the motor vehicle and an electrical current generating alternator operably connected to the engine to be driven thereby. The alternator is a three-phase AC alternator having a first DC rectifier which converts AC current to a first DC current with phases to operating simultaneously and a second DC rectifier which converts AC current to a second DC current with phases to operating simultaneously.

According to yet anther aspect of the present invention, a portable welding apparatus for use with an engine of a motor vehicle includes an electrical current generating alternator to be operably connected to the engine and driven thereby. The alternator is a three-phase AC alternator having a first DC rectifier which converts AC current to a first DC current using resistors across phase to lag each phase at 120 degrees allowing phases to operate simultaneously and a second DC rectifier which converts AC current to a second DC current using resistors across phase to lag each phase at 120 degrees allowing phases to operate simultaneously. The alternator includes a three phase armature having three windings and the first and second DC rectifiers each include six diodes connected to the armature, the diodes are configured in three parallel legs with each leg having two of the diodes, and the three legs are connected to separate ones of the three windings between the diodes. The first and second DC rectifiers each have two of the resistors, a first one of the resistors connects a first one of the legs with a second one of the legs between the diodes, and a second one of the resistors connects the second one of the legs with a third one of the legs between the diodes. Preferably, the armature is wound in a wye configuration.

From the foregoing disclosure and the following more detailed description of various preferred embodiments it will be apparent to those skilled in the art that the present invention provides a significant advance in the technology and art of portable welders. Particularly significant in this regard is the potential the invention affords for providing a high quality, reliable, high power, easily assembled, low cost portable welder. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
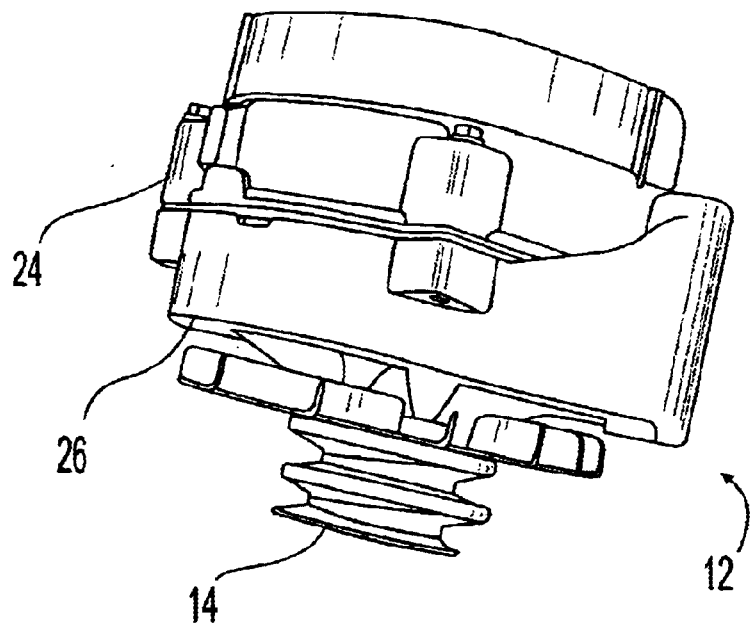
FIG. 1 is a side view of an alternator of a portable engine-driven welding apparatus according to the present invention.
Figure 2:
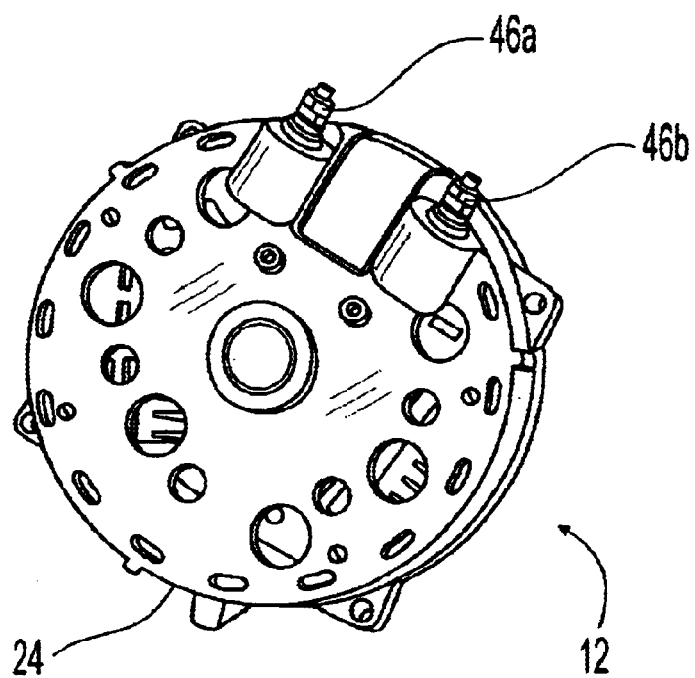
FIG. 2 is a rear view of the alternator of FIG. 1.
Figure 3:
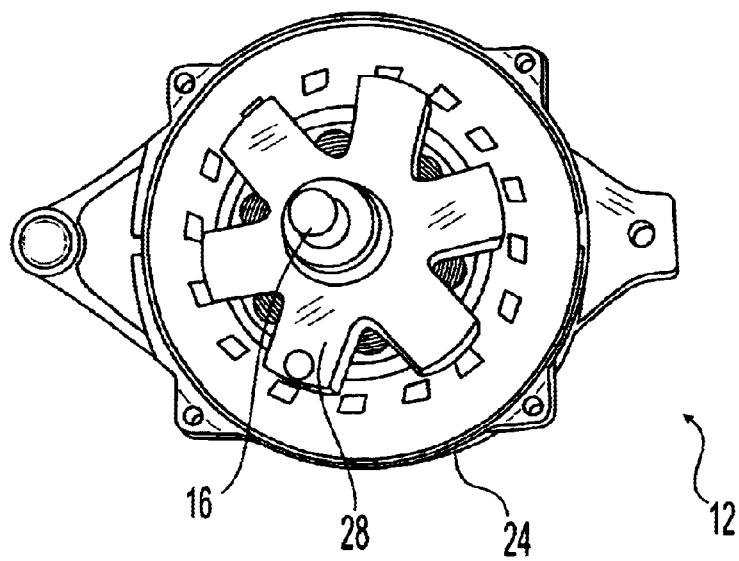
FIG. 3 is a front view of the alternator of FIGS. 1 and 2 with a housing cover removed to show a rotor.
Figure 4:
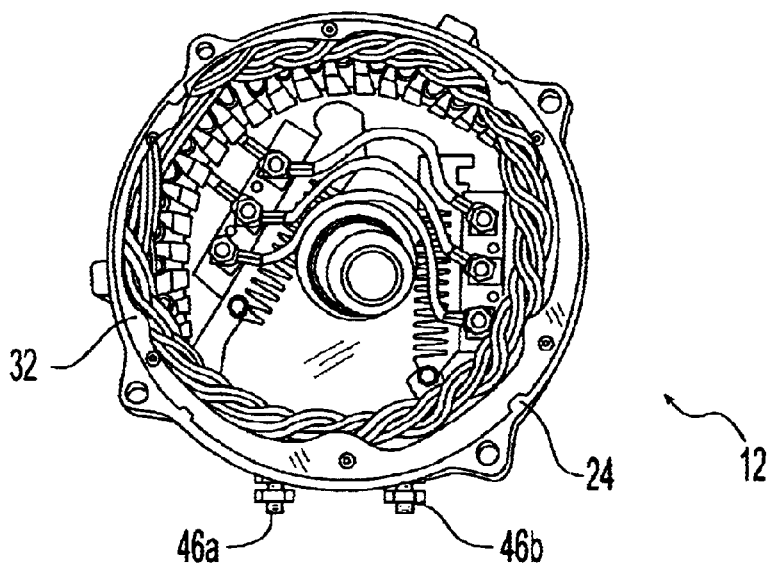
FIG. 4 is a front view of the alternator of FIGS. 1 to 3 with the housing cover and the rotor removed to show the stator.

It should be understood that the appended drawings are not necessarily to scale, presenting a somewhat simplified representation of various preferred features illustrative of the basic principles of the invention. The specific design features of the portable welder as disclosed herein, including, for example, specific dimensions, orientations, and shapes of stator components will be determined in part by the particular intended application and use environment. Certain features of the illustrated embodiments have been enlarged or distorted relative to others to facilitate visualization and clear understanding. All references to direction and position, unless otherwise indicated, refer to the orientation of the alternator illustrated in the drawings. In general, fore or forward refers to a direction into the plane of the paper in FIG. 2 and aft or rearward refers to a direction out of the plane of the paper in FIG. 2.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved portable welding apparatus disclosed herein. The following detailed discussion of various alternative and preferred embodiments will illustrate the general principles of the invention with reference to a portable welder which is driven by an engine of a motor vehicle. Other embodiments suitable for other applications will be apparent to those skilled in the art given the benefit of this disclosure such as for example portable welders driven by other types of engines.

As shown in FIGS. 1–5, the portable welding apparatus according to the present invention includes an internal combustion engine 10 of a motor vehicle and an electrical current generating alternator 12. The alternator 12 is a three-phase AC alternator. The alternator 12 is preferably mounted near the engine 10 and operably connected thereto such that the alternator is driven by the engine 10. The illustrated alternator has a pulley 14 mounted on a rotable shaft 16 which receives a drive belt 18 driven by a shaft 20 and pulley 22 connected to and driven by the engine 10.

The alternator 12 includes a housing 24 having a having a generally closed rear end generally closed by a housing cover 26. A rotor 28 is located within the housing 24 and secured to the shaft 16 for rotation therewith within a housing 24. The shaft 16 extends through the housing cover 26 to the pulley 14 which is located outside the housing 24. The rotor 28 is provided with a coil 30 which is adapted to cooperate with a stator 32 also mounted within the housing 24. The stator 32 is rigidly mounted to the housing 24 such that the rotor 28 rotates relative to the stator 32 as is known in the art.

Figure 5:
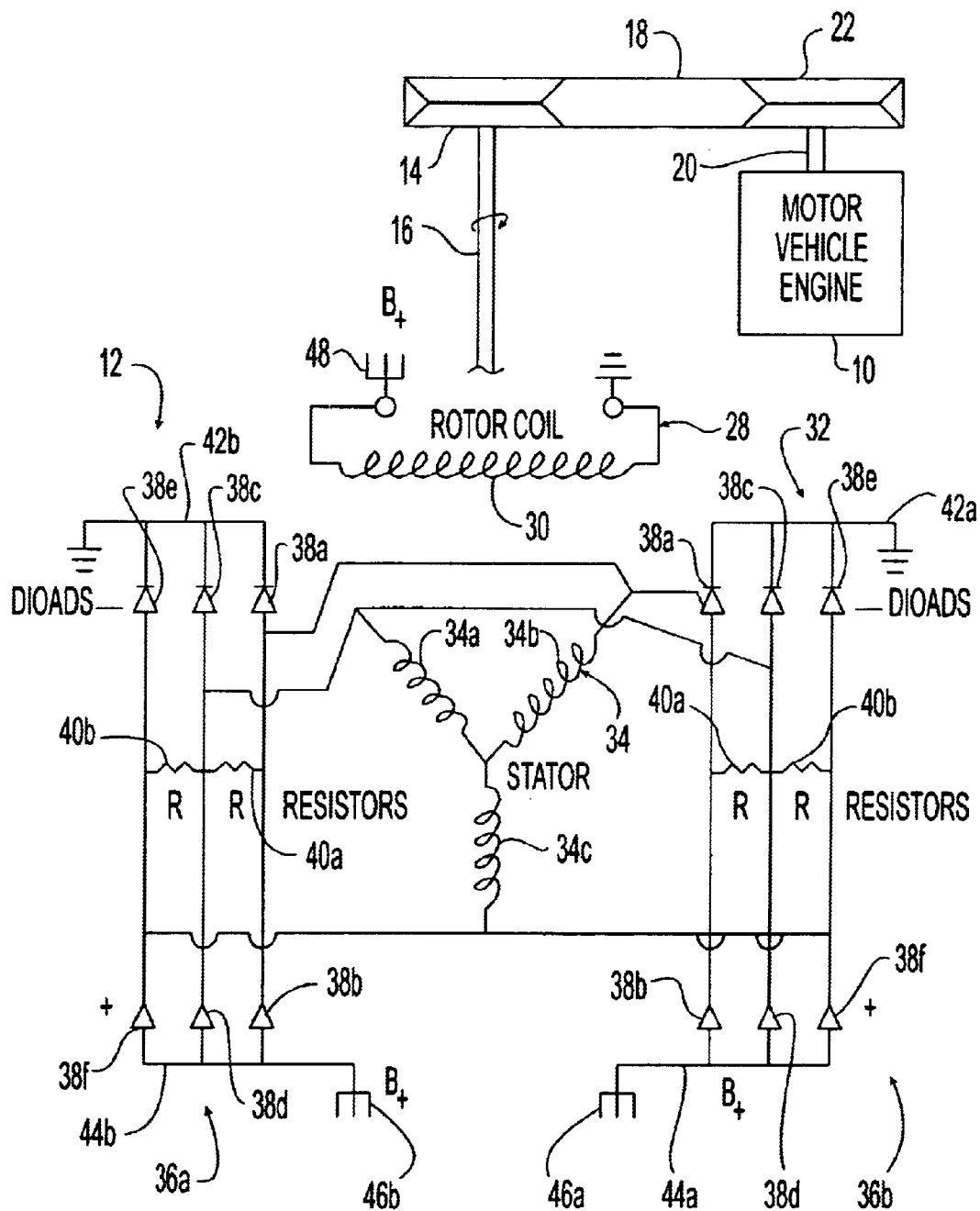
FIG. 5 is a schematic view of the alternator of FIGS. 1 to 4.

As best shown in FIG. 5, the stator 32 includes a three phase armature 34 and a pair of DC rectifier circuits 36a and 36b which converts AC current to two separate DC currents. The armature 34 is shown wound as a star or wye consisting of three windings 34a, 34b, 34c. While the three phase armature 34 is preferably wound as a wye configuration, it is noted that the armature 34 can be wound in suitable alternative configurations such as, for example, a delta configuration.

Each rectifier circuit 36a, 36b is a three phase bridge rectifier which includes six diodes 38a, 38b, 38c, 38d, 38e, 38f and two resistors 40a, 40b. The diodes 38a, 38b, 38c, 38d, 38e, 38f and resistors 40a, 40b are connected to the windings 34a, 34b, 34c as illustrated to produce positive and negative voltages on the separate lines 42, 44. The diodes 38a, 38b, 38c, 38d, 38e, 38f are configured in three parallel legs with each leg having a pair of the diodes 38a, 38b, 38c, 38d, 38e, 38f connected in series. The lines 42, 44 connect opposite ends of the legs and each leg is connected to one of the windings 34a, 34b, 34c between the diodes 38a, 38b, 38c, 38d, 38e, 38f of that leg. The resistors 40a, 40b connect the legs between the diodes 38a, 38b, 38c, 38d, 38e, 38f such that one leg is connected to each of the other legs by a separate one of the resistors 40a, 40b. Using the resistors across phase to lag each phase at 120 degrees allows phases to operate simultaneously. As can be seen the alternator 12 utilizes the two rectifier circuit 36a, 36b which have identical configurations are each connected to the armature 34 in the same manner. Thus two separate DC currents or voltages across two separate pairs of lines 42a, 44a, 42b, 44b. Preferably, two separate DC output terminals or taps 46a, 46b are provided for the two separate DC currents so that the two currents can be selectively used separately or combined. But alternatively a single terminal can be utilized which uses the combined currents produced by the two rectifier circuits 36a, 36b. The terminals 46a, 46b are provided on the outside of the housing 24 and exposed so that welding equipment can be easily attached and removed as desired.

Preferably, an AC output terminal or tap 48 is provided for the AC current produced by the rotor coil 30 so that the AC current can be utilized for operating selected auxiliary power equipment. The terminal 48 utilizes the AC current or voltage across the coil 30. The terminal 48 is preferably provided on the outside of the housing 24 and exposed so that the auxiliary power equipment can be easily attached and removed as desired.

The alternator 12 can generate over 300 amps AC and 300 amps DC as well as corresponding AC volts and DC volts. While an operating prototype has been built and tested which produces over 300 amps AC and 300 amps DC, it is believed that the principles of this invention can be utilized to build an alternator which generates at least 1000 amps AC and 1000 amps DC. The alternator can be utilized to simultaneously operate welders using the DC current as well as auxiliary power tools or equipment such as, for example, electric lights using the AC current. The alternator, therefore, acts as both a DC welding power source and an AC auxiliary power source. It should be appreciated that the instant alternator 12 produces significantly greater power than any alternators here before known and thus can be utilized to power welders that could not previously be easily used at remote locations and/or to simultaneously power multiple welders and auxiliary power equipment.

To use the instant alternator 12 for arc welding, a potentiometer control knob is adjusted to set the output of the alternator 12 to produce a desired and adequate welding heat. A ground clamp is clamped to the work to be welded and an arc is struck between the work and a welding rod held by a clamp connected to the positive side of the welder taps 46a, 46b.

From the foregoing disclosure and detailed description of certain preferred embodiments, it will be apparent that various modifications, additions and other alternative embodiments are possible without departing from the true scope and spirit of the present invention. For example, it will be apparent to those skilled in the art, given the benefit of the present disclosure, that the stator and rotor can each have many different configurations. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A portable welding apparatus for use with a motor vehicle comprising, in combination:
   an internal combustion engine of the motor vehicle; and
   an electrical current generating alternator operably connected to the engine to be driven thereby, wherein the alternator is a three-phase AC alternator having a first DC rectifier which converts AC current to DC current using resistors across phase to lag each phase at 120 degrees allowing phases to operate simultaneously.

2. The portable welding apparatus according to claim 1, wherein the alternator includes a second DC rectifier which converts AC current to DC such that two separate DC currents are produced by the first and second rectifiers.

3. The portable welding apparatus according to claim 1, wherein separate output terminals are provided for the two separate DC currents.

4. The portable welding apparatus according to claim 1, wherein the alternator includes a three phase armature having three windings and the first DC rectifier includes six diodes connected to the armature, the diodes are configured in three parallel legs with each leg having two of the diodes, and the three legs are connected to separate ones of the three windings between the diodes.

5. The portable welding apparatus according to claim 4, wherein the armature is wound in a wye configuration.

6. The portable welding apparatus according to claim 4, wherein there are two of the resistors, one of the resistors connects a first one of the legs with a second one of the legs between the diodes, and the other of the resistors connects the second one of the legs with a third one of the legs between the diodes.

7. The portable welding apparatus according to claim 1, wherein an AC output terminal is provided for the AC current to power auxiliary power equipment.

8. The portable welding apparatus according to claim 7, wherein DC output terminals are provided for the DC current to power welding equipment.

9. The portable welding apparatus according to claim 1, wherein DC output terminals are provided for the DC current to power welding equipment.

10. The portable welding apparatus according to claim 1, wherein the alternator generates at least 300 amps AC and 300 amps DC.

11. A portable welding apparatus for use with a motor vehicle comprising, in combination:
    an internal combustion engine of the motor vehicle;
    an electrical current generating alternator operably connected to the engine to be driven thereby, wherein the alternator is a three-phase AC alternator having a first DC rectifier which converts AC current to a first DC current with phases operating simultaneously and a second DC rectifier which converts AC current to a second DC current with phases operating simultaneously;
    wherein the alternator includes a three phase armature having three windings and the first and second DC rectifiers each include six diodes connected to the armature, the diodes are configured in three parallel legs with each leg having two of the diodes, and the three legs are connected to separate ones of the three windings between the diodes; and
    wherein the first and second DC rectifiers each have two resistors, one of the resistors connects a first one of the legs with a second one of the legs between the diodes, and the other of the resistors connects the second one of the legs with a third one of the legs between the diodes.

12. The portable welding apparatus according to claim 11, wherein separate output terminals are provided for the first and second DC currents.

13. The portable welding apparatus according to claim 11, wherein the armature is wound in a wye configuration.

14. The portable welding apparatus according to claim 11, wherein an AC output terminal is provided for the AC current to power auxiliary power equipment.

15. The portable welding apparatus according to claim 14, wherein separate DC output terminals are provided for the first and second DC currents to power welding equipment.

16. The portable welding apparatus according to claim 11, wherein the alternator generates at least 300 amps AC and 300 amps DC.

17. A portable welding apparatus for use with an engine of a motor vehicle comprising, in combination:
    an electrical current generating alternator to be operably connected to the engine and driven thereby, wherein the alternator is a three-phase AC alternator having a first DC rectifier which converts AC current to a first DC current using resistors across phase to lag each phase at 120 degrees allowing phases to operate simultaneously and a second DC rectifier which converts AC current to a second DC current using resistors across phase to lag each phase at 120 degrees allowing phases to operate simultaneously;
    wherein the alternator includes a three phase armature having three windings and the first and second DC rectifiers each include six diodes connected to the armature, the diodes are configured in three parallel legs with each leg having two of the diodes, and the three legs are connected to separate ones of the three windings between the diodes; and
    wherein the first and second DC rectifiers each have two of the resistors, a first one of the resistors connects a first one of the legs with a second one of the legs between the diodes, and a second one of the resistors connects the second one of the legs with a third one of the legs between the diodes.

18. The portable welding apparatus according to claim 17, wherein the armature is wound in a wye configuration.

* * * * *